United States Patent [19]

Inomata et al.

[11] 4,424,459
[45] Jan. 3, 1984

[54] HIGH FREQUENCY SWITCHING CIRCUIT

[75] Inventors: Koichiro Inomata, Yokohama; Michio Hasegawa, Machida; Toshihiro Onodera, Kunitachi, all of Japan

[73] Assignee: Tokyo Shibaura Denki Kabushiki Kaisha, Kawasaki, Japan

[21] Appl. No.: 390,888

[22] Filed: Jun. 22, 1982

[30] Foreign Application Priority Data

Jun. 25, 1981 [JP] Japan ................... 56-97527

[51] Int. Cl.$^3$ ............................................. G11C 13/02
[52] U.S. Cl. .................... 307/415; 307/416; 148/403
[58] Field of Search ............ 307/415, 416, 417, 418; 330/8; 148/403

[56] References Cited

U.S. PATENT DOCUMENTS 2,850,725  9/1958  Begumont ........................ 330/8 X
3,348,129  10/1969  Schonholzer ........................ 307/416
4,225,339  9/1980  Inomata et al. .

FOREIGN PATENT DOCUMENTS 53-35618  4/1978  Japan .
840050  7/1960  United Kingdom ............. 207/416

Primary Examiner—Elliot A. Goldberg
Assistant Examiner—Derek Jennings

Attorney, Agent, or Firm—Oblon, Fisher, Spivak, McClelland & Maier

[57] ABSTRACT

A high frequency switching circuit comprised of a single-ended switching circuit, rectifying-smoothing circuit and magnetic amplifier which is connected between said single-ended switching circuit and rectifying-smoothing circuit. The magnetic amplifier includes a saturable reactor which has a coercive force Hc of 0.6 Oe or above and a rectangular ratio Br/Bs of 80% or below at an operating frequency of 20 kHz. The saturable reactor is prepared from an amorphous magnetic alloy having a composition of $(Co_{1-a-b-c} Fe_a Ni_b M_c)_{1-d} X_d$ 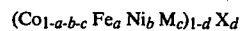

where:
M = one element selected from a group consisting of the elements of Nb, Cr, Mo, V, Ta, Ti, Zr and W
X = B or a compound of B and Si in which the content of Si is set at 25 atomic % or less $0.04 \leq a \leq 0.15$ $0 \leq b \leq 0.10$ $0.005 \leq c \leq 0.10$ $0.15 \leq d \leq 0.30$.

9 Claims, 17 Drawing Figures

F I G. 2A
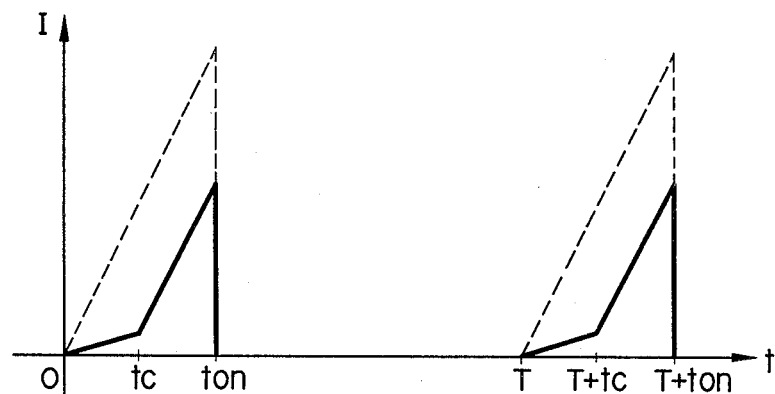
F I G. 2B
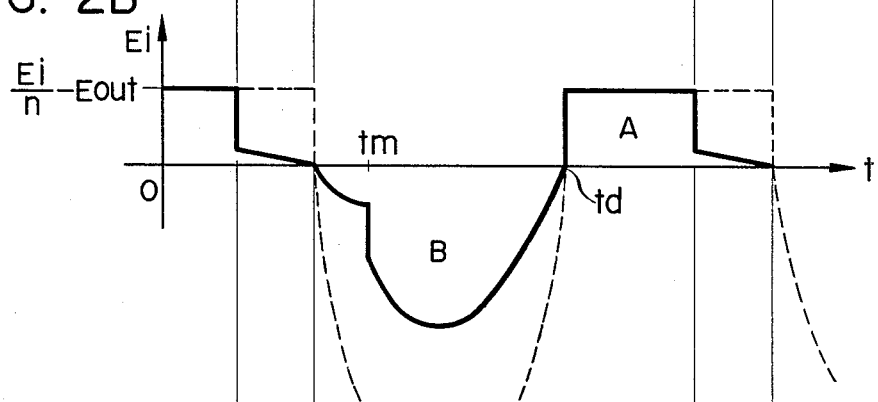
F I G. 2C
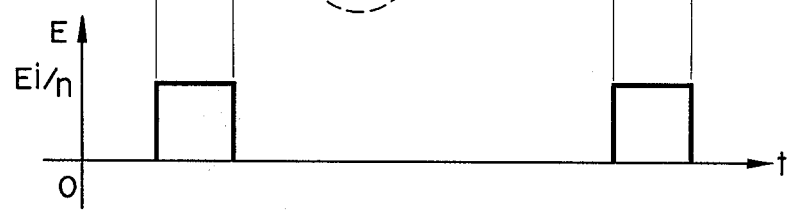

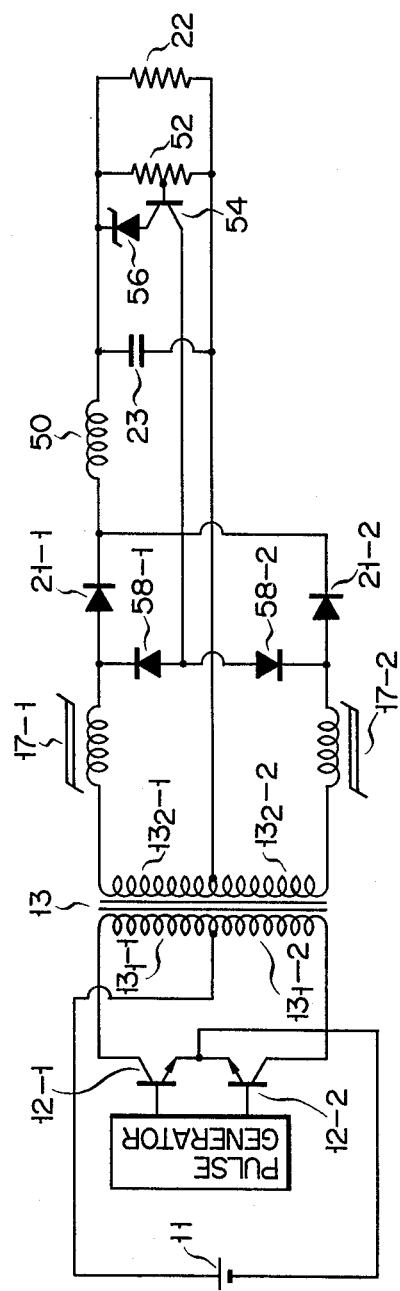
F I G. 15

HIGH FREQUENCY SWITCHING CIRCUIT

BACKGROUND OF THE INVENTION

This invention relates to a high frequency switching circuit, and more particularly to an improvement on a high frequency switching circuit using a single-ended switching circuit described in the U.S. patent application (Ser. No. 349,093) filed on Feb. 16, 1982.

A low voltage power supply stable at high current has hitherto been used with the peripheral units of a computer system and conventional communication devices. The power source has often been the type which is characteristically reduced in size and weight and has a high frequency. With a switching power supply utilizing voltage or current resonance waves, its main switching element such as a transistor, thyristor or MOSFET has a sufficiently high switching efficiency, and can be operated with little occurrence of noises. A subclass-E switching circuit used with the conventional power source is so constructed as to cause a voltage signal whose waveform corresponds to the arc of a resonance waveform to be produced between the terminals of a switching element. To this end, the switching cycle and conduction period of a switching element and the constants of an external circuitry are set at the predetermined levels. That type of the aforementioned subclass-E switching circuit which utilizes a voltage resonance waveform has a higher power-converting efficiency than a control circuit admits, thereby reducing the range of control, and failing to provide a power supply or power amplifier having a desired stability.

SUMMARY OF THE INVENTION

The object of this invention is to provide a voltage resonance type high frequency switching circuit which enables power control to be effected by a simple arrangement and over a wide range.

To attain the above-mentioned object, this invention provides a high frequency switching circuit which comprises:

a single-ended switching circuit which includes a transformer having a primary winding and a secondary side circuit and a switching element connected between the primary winding of said transformer and a DC power supply;

means for effecting switching with a predetermined cycle and for a predetermined conductive period;

means for rectifying and smoothing a supplied voltage which includes a filtering capacitor connected in parallel to a rectifying element and a load element; and a magnetic amplifier connected between the secondary side circuit of said transformer and said rectifying and smoothing means and including a saturable reactor which has a coercive force Hc of 0.6 Oe or below and a rectangular ratio Br/Bs of 80% or above at an operating frequency of 20 kHz or above and which is prepared from an amorphous magnetic alloy having a composition of $(Co_u Fe_v Ni_w)100-z X_z$ or $(Co_u Fe_{1-u})100-x-y T_x B_y$, where X is at least is one element selected from a group consisting of P, B, C, Si and Ge; $0 \leq u \leq 1.0$; $0 \leq v \leq 1.0$; $0 \leq w \leq 0.7$; $15 \leq z \leq 30$; $u+v+w=1.0$; M is Fe and/or Co; T is at least one element selected from a group consisting of Ti, Zr, Hf, V, Nb, Ta, Cr, Mo and W; $6 \leq x \leq 15$ and $0 \leq y \leq 10$.

BRIEF DESCRIPTION OF THE DRAWINGS

FIGS. 2A, 2B and 2C is a timing chart illustrating the operation of the high frequency switching circuit of FIG. 1;

FIG. 3 is a circuit diagram of an equivalent circuit to that of FIG. 1, when a switching element therein is turned on;

FIGS. 14 and 15 are circuit diagrams of a high frequency switching circuits according to another embodiment of the invention.

DETAILED DESCRIPTION OF THE PREFERRED EMBODIMENTS

Figure 1:
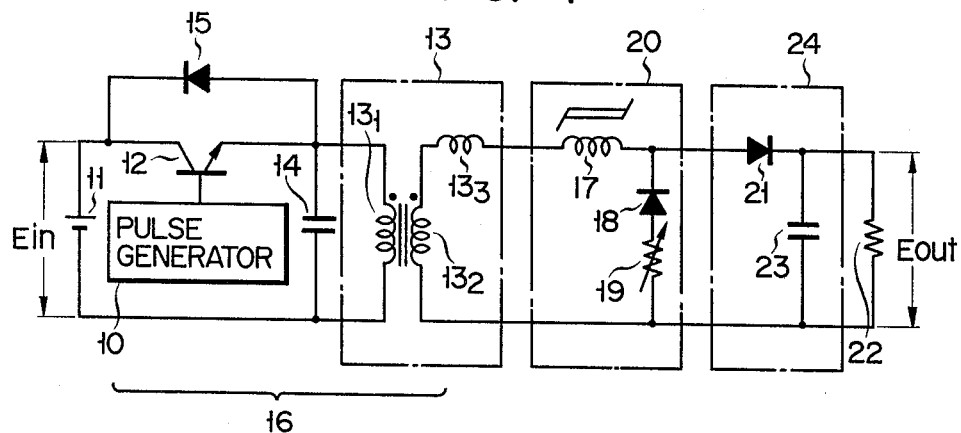
FIG. 1 is a circuit diagram of a voltage resonance type high frequency switching circuit according to one embodiment of this invention.

Referring to FIG. 1, the positive terminal of a power supply 11 is connected to the collector of a transistor 12 acting as a switching element. The base of the transistor 12 is connected to a pulse generator 10 which generates pulses having a predetermined width with a prescribed cycle. The emitter of the transistor 12 is connected to the negative terminal of the power supply 11 through the primary winding $13_1$. A damper diode 15 is connected between the collector and emitter of the transistor 12 in a reverse direction. The transistor 12, transformer 13, resonance capacitor 14 and damper diode 15 collectively constitute a single-ended switching circuit 16.

One end of the secondary winding $13_2$ of the transformer 13 is connected through a coil $13_3$ to one end of a saturable reactor 17. The other end of which is connected to the cathode of a reflux diode 18. The anode of the diode 18 is connected through the variable resistor 19 to the other terminal of the secondary winding $13_2$. The saturable reactor 17, reflux diode 18 and a variable resistor 19 jointly constitute a magnetic amplifier 20.

The other terminal of the saturable reactor 17 is connected to the anode of a rectifier diode 21, and the cathode of the diode 21 is connected through a load 22 to the other terminal of the secondary winding 13₂ of the transformer 13. A filtering capacitor 23 is connected in parallel with the load 22, and the filtering capacitor 23 and rectifier diode 21 collectively constitute a rectifying/smoothing circuit 24.

With the single-ended switching circuit 16, the switching cycle and conducting period of the transistor 12, capacitance of the resonance capacitor 14, excitation inductance of the transformer 13, etc. are set at values related to one another, enablig the voltage applied between the collector and emitter of the transistor 12 to have a waveform corresponding to the arc of a sine wave. Also, the ampere-turns of the saturable reactor 17 are made to correspond to the positive output voltage of the secondary winding of the transformer 13, thereby assuring the self feedback of the magnetic amplifier 20.

The operation of a voltage resonance type high frequency switching circuit constructed as described above will be better understood with reference to the following description.

If the magnetic amplifier 20 is omitted from the high frequency switching circuit of FIG. 1, i.e., if the secondary side output terminals of the transformer 13 are directly connected to the rectifying/smoothing circuit 24, then a voltage having a waveform as shown by a broken line of FIG. 2A, appears on the secondary side of the transformer 13. When the transistor 12 is triggered at an instant t0, current is supplied from the power supply 11 to a parallel composite inductance constituted by the excitation inductance L1 and leakage inductance L2 of the transformer 13. At this time, a current flowing through the composite inductance increases linearly as shown by the broken line of FIG. 2A. When the transistor 12 is turned off at an instant $t_{on}$, the current that has flowed through the composite inductance flows into the resonance capacitor 14 due to inertia. At this time current is supplied in the negative form with respect to the power supply 11, and the voltage across the resonance capacitor 14 is gradually reduced from the value of the voltage (+Ein) of the power supply 11 to the negative level. When reaching a maximum negative level, the capacitor terminal voltage turns to the positive level, ultimately reaching the level of +Ein again as shown by a broken line in FIG. 2B. The waveform of a terminal voltage impressed across the resonance capacitor 14 is characterized in that the area of the positive voltage waveform bears a relatively small ratio as 0.5 to 2 with that of the negative voltage waveform.

Figure 3:
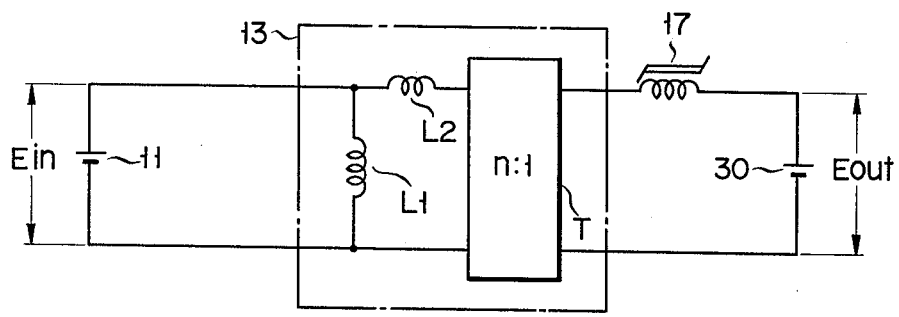
Figure 4:
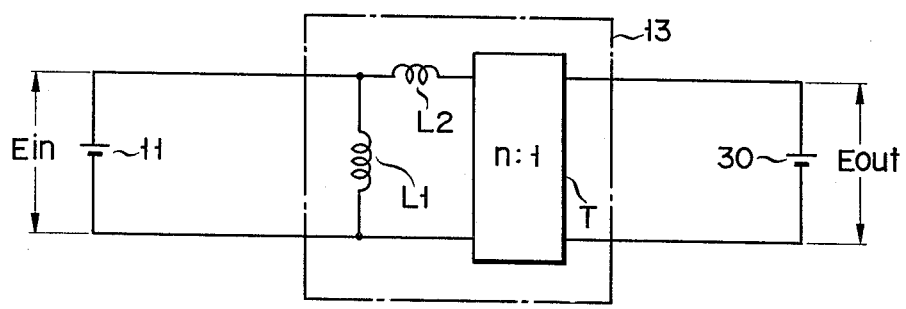
FIG. 4 is a circuit diagram of an equivalent circuit to that of FIG. 1, when a saturable element received therein is saturated.

Now, the operation of the high frequency switching circuit including the magnetic amplifier will be described. The transistor 12 is rendered conducting or nonconducting, when a train of pulses having a predetermined width is applied from the pulse generator 10 to the base of said transistor 12 with a predetermined cycle. When the transistor 12 is turned on, the rectifier diode 21 is also turned on as is apparent from the polarity of the transformer 13. When the state of the high frequency switching circuit is shifted from a transient to a steady level, a parallel circuit constituted by the filtering capacitor 23 and load 22 acts as a battery. FIG. 3 shows an equivalent circuit of the switching circuit of FIG. 1 having the steady state. In this case, it is assumed that the transformer 13 is an ideal type and the battery 30 is an equivalent battery constituted by the filtering capacitor 23 and load 22. In the initial stage of the conduction of the transistor 12, the saturable reactor 17 remains unsaturated, causing the reactor 17 to have a very high impedance. In this state, a current from the power supply has a substantially equal level to that which is supplied through the excitation inductance L1 of the transformer 13. This current appears during a period extending from a point of time t0 to a point of time $t_c$ as shown by a solid line in FIG. 2A. When the saturable reactor 17 is subsequently saturated (hereinafter, this state is referred to as "being set"), the impedance of the reactor 17 is substantially reduced to zero. FIG. 4 shows an equivalent circuit of the switching circuit of FIG. 1 at this time. Under such condition of the circuit, the current flowing from the power supply 11 through the leakage inductance L2 into the equivalent battery 30 suddenly changes its course to the excitation inductance L1. A current supplied to the excitation inductance L1 during the period $t_c - t_{on}$ is shown by a solid line in FIG. 2A. During said period, a terminal voltage across the saturable reactor 17 is substantially zero.

Figure 5:
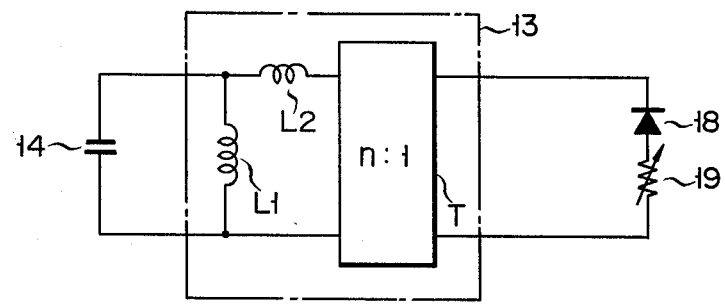
FIG. 5 is a circuit diagram of an equivalent circuit to that of FIG. 1, when a switching element therein is turned off.

When the transistor 12 is turned off, the power supply 11 is disconnected from the high frequency switching circuit. FIG. 5 shows an equivalent circuit of the switching circuit of FIG. 1 under the condition in which the saturable reactor 17 is saturated. In this state, the excitation current through the transformer 13 and the current through the load 22 at an instant $t_{on}$ flow into the resonance capacitor 14.

Figure 6:
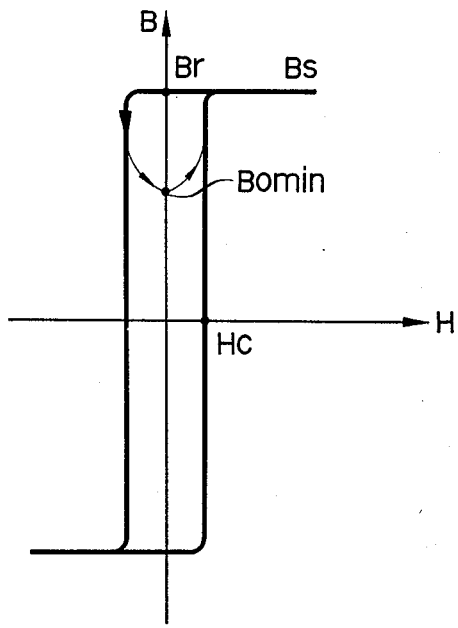
FIG. 6 graphically shows the hysteresis curve of a saturable reactor included in a magnetic amplifier used with the switching circuit of FIG. 1.

The terminal voltage across the resonance capacitor 14 tends to change along the arc of the resonance waveform shown by a broken line in FIG. 2B. In this state, however, the diode 18 is forwardly biased, causing the diode 18 to be turned on. Thus, a reverse current flows through the diode 18 and variable resistor 19 into the reactor 17. In other words, the current through the leakage inductance L2 and the current flowing through the variable resistor 19 in the opposite direction to the current through the leakage inductance L2 are superimposed upon each other during the passage through the saturable reactor 17. At the instant $t_{on}$ a current from the leakage inductance L2 passes through the saturable reactor 17. At the instant $t_m$ no current passes through the leakage inductance L2, namely, the saturable reactor 17 is reset. During a period extending from the instant $t_{on}$ to the instant $t_m$, a magnetic flux produced by the saturable reactor has its density changed as shown in FIG. 6. The magnetic flux gradually returns from the saturated density Bs to the active region and proceeds to a residual magnetic flux density Br. From the saturated magnetic flux density Bs till the residual magnetic flux density Br, the magnetic flux density usually changes substantially linearly, and the impedance between the terminals of the saturable reactor 17 is extremely low. During the period $t_{on} - t_m$, therefore, only a low voltage as shown in FIG. 2A are applied to the saturable reactor 17. After the leakage inductance current has completely ceased to flow, the magnetic flux density appearing in the saturable reactor 17 is determined by a magnetic flux provided by a flyback pulse generated in the secondary winding 13₂ of the transformer 13. This magnetic flux density is lower than the residual magnetic flux density Br and changes within the active region. A minimum magnetic flux density Bomin is equal to a quotient arrived at by dividing the area B of the voltage waveform shown in FIG. 2B by the number $\mu$ of the turns of the coil of the saturable reactor 17 and the sectional area S of the core of the reactor 17. After an instand $t_d$, a flux density provided by the saturable reactor 17 increases again, since a positive potential is applied to the reactor 17. During the period from an instant $t_d$ till an instant $T+t_c$, in which the voltage area A becomes equal to the aforementioned area B, the saturable reactor 17 is saturated, causing substantially no impedance to arise in the reactor 17. Thus, the circuit of FIG. 1 is equivalent to that of FIG. 4, and a voltage shown in FIG. 2C is supplied to the load 22. This voltage can be controlled by the variable resistor 19. The area A of the positive voltage waveform varies with the area B of the negative voltage waveform by adjusting the resistance of the variable resistor 19. Consequently, while reactance in the saturable reactor 17 is changed, the magnitude of power supplied to the load 22 is controlled.

As previously described, the magnetic amplifier 20 provided on the secondary side of the transformer 13 enables power control to be effected with a high power conversion efficiency and over a wide range.

Figure 7:
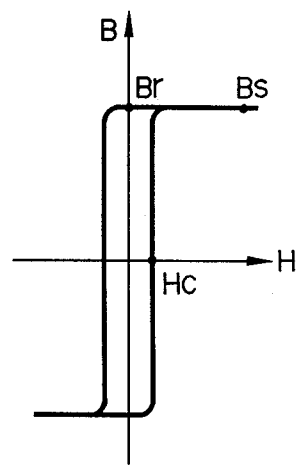
FIG. 7 graphically indicates the hysteresis curve of a saturable reactor whose core material has a high rectangular ratio.
Figure 8:
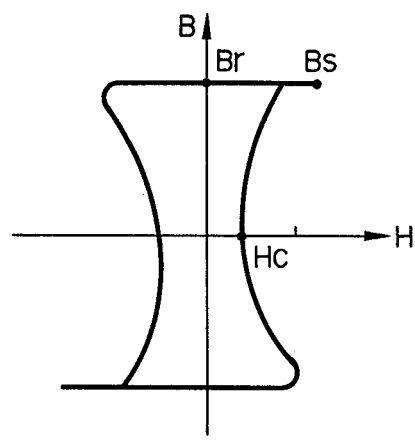
FIG. 8 graphically shows the hysteresis curve of a saturable reactor operable with a high frequency.

In the above embodiment, the saturable reactor is the type which indicates a hysteresis characteristic having a high rectangular ratio as shown in FIG. 6. With the core material prepared from the ordinary material such as Sendelta (trademark) and the hysteresis characteristic represented as DC, the rectangular ratio indicates a high value. FIG. 7 shows a hysteresis curve thus obtained. However, where the saturable reactor whose core is prepared from the aforementioned material is driven at a high frequency of the order of 100 kHz, a hysteresis curve having projecting shoulders results as shown in FIG. 8, that is, the coercive force is extremely increased. Such a hysteresis characterized results from the peculiar hysteresis character of the core material which cannot be improved by reducing the core plate thickness even to the order of 10 microns.

Figure 9:
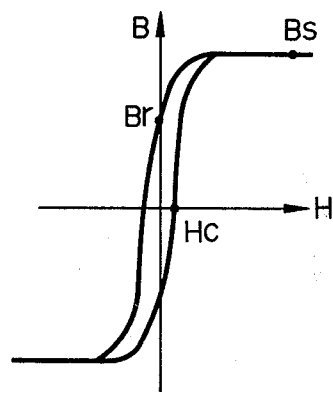
FIG. 9 graphically sets forth the hysteresis curve whose core material has a low rectangular ratio.
Figure 10:
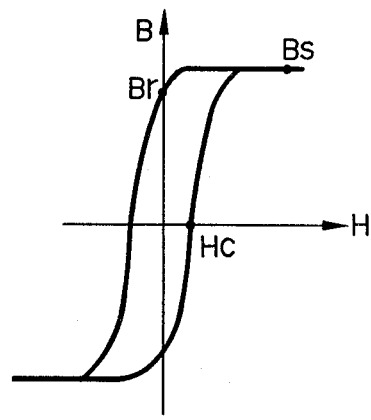
FIG. 10 graphically indicates a hysteresis curve observed when a saturable reactor whose core material having a low rectangular ratio was operated with a high frequency.

A magnetic material such as an amorphous alloy has a hysteresis characteristic as shown in FIG. 9. Although the rectangular ratio Br/Bs of the amorphous magnetic alloy at DC is 40 to 50% which is below the DC rectangular ratio of Sendelta or a similar magnetic material, a hysteresis curve shown in FIG. 10 can be obtained at high frequencies of the order of 50 kHz, because the rectangular ratio at this time indicates 94%, a higher level than that of the DC. Thus, the aforementioned amorphous magnetic alloy can be sufficiently used as a magnetic amplifier to obtain high frequencies. Not only the rectangular ratio, but also the coercive force is force an important factor of the core material of the magnetic amplifier. The conventional magnetic material such as Sendelta which indicates a high rectangular ratio at DC provides a low coercive force at DC, but at high frequencies shows an apparently very high coercive force Hc due to increased eddy current. Therefore, the magnetic material of Sendelta can not be used as the core material at a higher frequency than 20 kHz. In contrast, the amorphous magnetic alloy does not show a high coercive force even at high frequencies, so that it can be sufficiently used with a high frequency magnetic amplifier.

Figure 11:
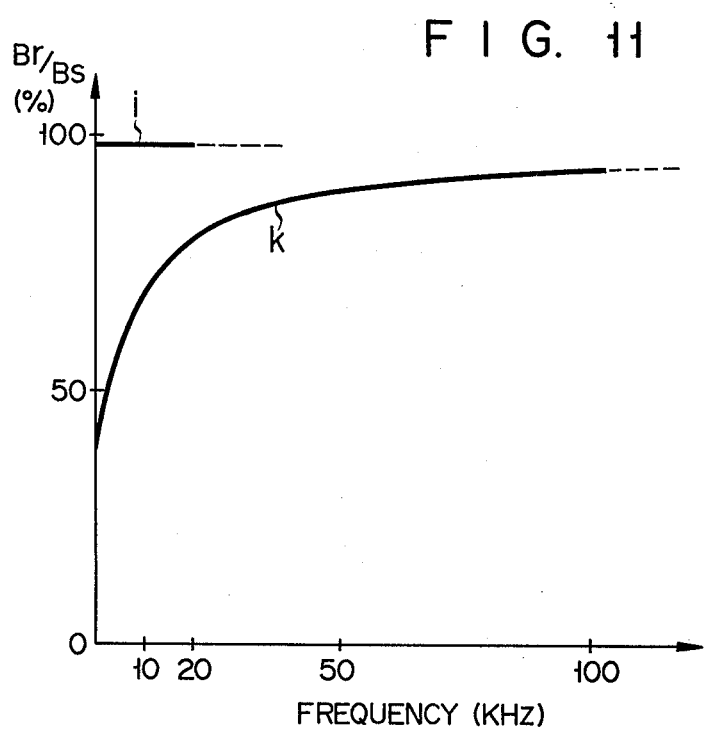
FIG. 11 graphically illustrates the rectangular ratio vs. frequency characteristic of various magnetic materials.

FIG. 11 shows the relation between the rectangular ratio Br/Bs and frequency with respect to Sendelta (i) and cobalt-based amorphous alloy (k) having a composition of $(Co_{0.90} Fe_{0.06} Cr_{0.04})$ as typical magnetic amplifier materials. In FIG. 11, a broken line represents a region which is incapable of measurement, namely, makes it impossible to determine the function of the magnetic amplifier. THe rectangular ratio of the Co-containing amorphous alloy (k) is only 29% at the DC but is 94% at the operating frequency of 100 kHz. This means that a magnetic amplifier using a Co-based amorphous alloy (k) can sufficiently function as such at high frequencies.

Figure 12:
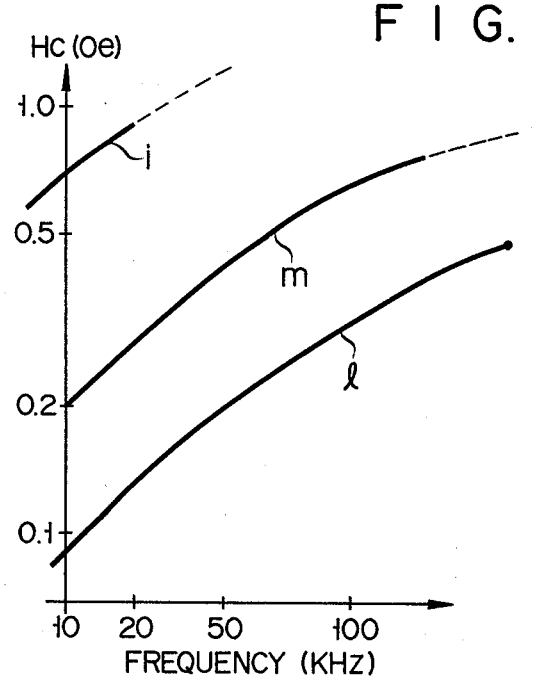
FIG. 12 graphically sets forth the corecive force vs. frequency characteristic of various magnetic materials.

FIG. 12 shows the relation between the coercive force Hc and frequency with respect to Sendelta (i) and amorphous alloys (l) and (m) respectively having compositions of $(Co_{0.88} Fe_{0.06} Nb_{0.03} Ni_{0.03})_{75} Si_{10} B_{15}$ and $(Fe_{0.045} Ni_{0.55})_{78} Si_{10} B_{12}$. As is seen from FIG. 12, the amorphous alloys (e) and (m) have a sufficiently small coercive force Hc at a higher frequency has 20 kHz, but Sendelta (i) has a coercive force of 0.9 Oe, making it impossible to measure said coercive force at a higher frequency than 20 kHz.

Figure 13:
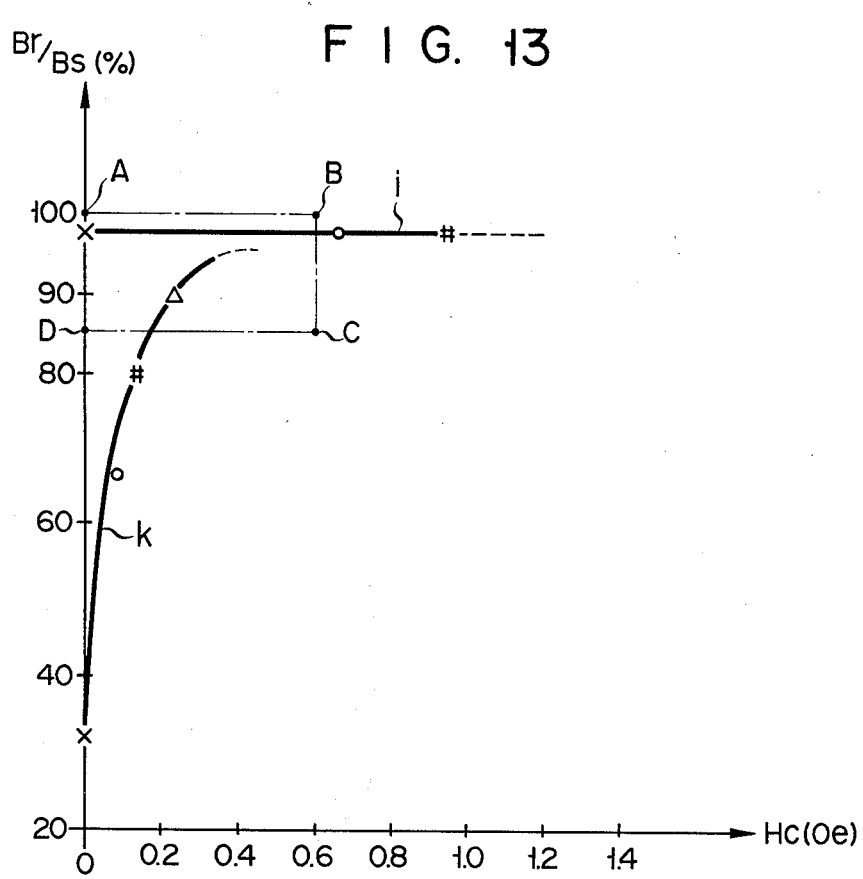
FIG. 13 graphically shows rectangular ratios corresponding to the coercive forces of various magnetic materials.

As seen from the foregoing description, an amorphous magnetic alloy having a coercive force Hc of 0.6 Oe or below at an operating frequency of 20 kHz or above and a rectangular ratio Br/Bs of 80% or above is adapted to be used as a magnetic amplifier applied to the high frequency switching circuit. In other words, an amorphous magnetic alloy having magnetic characteristics enclosed in a region of a rectangle ABCD in FIG. 13 is desired as the magnetic material of the high frequency magnetic amplifier. FIG. 13 shows the relation between the rectangular ratio Br/Bs and coercive force Hc with the frequency taken as a third parameter. Marks ×, 0, #, Δ and * respectively show characteristics at DC, 10 kHz, 20 kHz, 50 kHz and 100 kHz. If a magnetic amplifier prepared from an amorphous magnetic alloy having a characteristic lying within the rectangle ABCD in FIG. 13 is used as a magnetic amplifier for the high frequency switching circuit of FIG. 1, it is possible to obtain a high frequency switching circuit which has high efficiency and operates stably.

It has been found that an amorphous magnetic alloy adapted to provide a saturable reactor for a magnetic amplifier is demanded to have the aforementioned characteristics, and should be composed of

where:
$0 \leq u \leq 1.0$
$0 \leq v \leq 1.0$
$0 \leq w \leq 0.7$
$15 \leq z \leq 30$
$u+v+w=1.0$
x = one selected from a group consisting of the elements such as P, B, C, Si and Ge.

In the above-mentioned composition, Fe, Co, or Fe or part of Co may be replaced by one selected from a group consisting of the elements such as Cr, Mn, Nb, Ti, Zr, W, Ta, V, Hf and Mo. The rate of said replacement is chosen to represent 10 atomic % of the whole composition.

The above-mentioned composition has been defined for the reason given below. The content of Ni is limited to 70 atomic %. The reason is that if said content rises above 70 atomic %, the saturated magnetic flux density and Curie temperature noticeably fall. X (at least one of a group consisting of P, B, C, Si and Ge) is an element assisting the growth of an amorphous structure. The content of X is chosen to be 15 to 30 atomic %, because if the content falls from 15 atomic % or rises above 30 atomic %, then difficulties arise in providing an amorphous material and it is impossible to obtain a high rectangular ratio and a low coercive force. Further, the content of at least one selected from a group consisting of Cr, Mn, Nb, Ti, Zr, W, Ta, V, Hf and Mo which can replace Fe, or Co or both is set at 10 atomic %. The reason is that if said content exceeds 10 atomic %, the substituted mass will become too brittle for practical handling, and further leads to a decline in the rectangular ratio and an increase in a coercive force at higher frequencies than 20 kHz.

Though the object of this invention can be attained by adopting the aforementioned composition, yet it is preferred to apply an amorphous magnetic alloy composed of:

$$(Co_{1-a-b-c}Fe_a Ni_b M_c)_{1-d} X_d \quad (1)$$

where:
M = one of a group consisting of Nb, Cr, Mo, V, Ta, Ti, Zr, Mn, Hf and W
X = B or B+Si
Si proportion = lower than 25 atomic %
a = 0.04 to 0.15
b = 0 to 0.10
c = 0.005 to 0.10
d = 0.15 to 0.30.

$$(Fe_{1-a} Ni_a)_{1-b} X_b \quad (2)$$

where:
X = B or B+Si (whose proportion is set at lower than 25 atomic %)
a = 0.3 to 0.7
b = 0.15 to 0.30.

Table I below exemplifies the above-mentioned composition.

TABLE I

| Amorphous Magnetic Alloy | Hc (Oe) | | | Br/Bs (%) | | |
|---|---|---|---|---|---|---|
| | 20 kHz | 50 kHz | 100 kHz | 20 kHz | 50 kHz | 100 kHz |
| $(Co_{0.90}Fe_{0.06}Cr_{0.04})_{77}Si_{10}B_{13}$ | 0.18 | 0.31 | 0.33 | 85 | 91 | 95 |
| $(Co_{0.88}Fe_{0.06}Ni_{0.04}Nb_{0.02})_{75}Si_{10}B_{15}$ | 0.19 | 0.29 | 0.33 | 85 | 87 | 92 |
| $(Fe_{0.4}Ni_{0.6})_{78}Si_8B_{14}$ | 0.30 | 0.45 | 0.59 | 81 | 83 | 90 |
| $(Fe_{0.4}Ni_{0.6})_{80}Si_{14}B_6$ | 0.28 | 0.41 | 0.58 | 81 | 83 | 90 |
| $(Fe_{0.45}Ni_{0.55})_{78}Si_{10}B_{12}$ | 0.27 | 0.40 | 0.58 | 81 | 83 | 89 |

The amorphous magnetic material meets the aforementioned requirements, even if it not only the aforesaid composition but also a composition of $M_{100-x-y} T_x B_y$.

In said composition,
M = either or both of the elements Fe, Co
T = one or two or more selected from a group consisting of Ti, Zr, Hf, V, Nb, Ta, Cr, Mo and W
$6 \leq x \leq 15$
$0 \leq y \leq 10$.

In the above-mentioned composition $M_{100-x-y} T_x B_y$, T denotes an element assisting the amorphous growth of the magnetic material. When T is applied in a smaller amount than 6 atomic % or a larger amount than 15 atomic %, then difficulties arise in the amorphous growth of the magnetic material. Further at high frequencies, it is difficult to assure a high rectangular ratio and a low coercive force. It is for this reason that the content of T is defined within the above-mentioned range from 6 to 15 atomic %.

B in said composition $M_{100-x-y} T_x B_y$ also represents an element assisting the amorphous growth of the magnetic material. The reason why the content of B is limited to 10 atomic % is that when said limit is exceeded difficulties arise in the amorphous growth of the magnetic material.

It has been disclosed that the magnetic material should preferably have a composition of $$(Co_{1-z} Fe_z)_{100-x-y} T_x B_y$$

where:
$8 \leq x \leq 12$
$0 \leq y \leq 7$
$0.01 \leq z \leq 0.10$.

Table II below exemplifies the above magnetic alloy.

TABLE II

| Amorphous Magnetic Alloy | Hc (Oe) | | Br/Bs (%) | |
|---|---|---|---|---|
| | 50 kHz | 100 kHz | 50 kHz | 100 kHz |
| $(Co_{0.99}Fe_{0.01})_{90}Nb_{10}$ | 0.35 | 0.41 | 89 | 92 |
| $(Co_{0.97}Fe_{0.03})_{90}Nb_{10}$ | 0.31 | 0.39 | 90 | 93 |
| $(Co_{0.94}Fe_{0.06})_{90}Nb_{10}$ | 0.25 | 0.30 | 94 | 96 |
| $(Co_{0.90}Fe_{0.10})_{90}Nb_{10}$ | 0.36 | 0.45 | 92 | 93 |
| $(Co_{0.94}Fe_{0.06})_{87}Nb_8B_5$ | 0.23 | 0.29 | 96 | 98 |
| $(Co_{0.94}Fe_{0.06})_{87}Zr_8B_5$ | 0.24 | 0.30 | 95 | 97 |
| $(Co_{0.94}Fe_{0.06})_{87}Hf_8B_5$ | 0.25 | 0.31 | 94 | 96 |
| $(Co_{0.94}Fe_{0.06})_{87}Nb_7Cr_1B_5$ | 0.26 | 0.32 | 94 | 96 |
| $(Co_{0.94}Fe_{0.06})_{87}Nb_6Mo_2B_5$ | 0.25 | 0.31 | 94 | 96 |
| $(Co_{0.94}Fe_{0.06})_{87}Nb_6Ta_2B_5$ | 0.25 | 0.31 | 94 | 96 |
| $(Co_{0.94}Fe_{0.06})_{87}Nb_6Ti_1B_6$ | 0.26 | 0.32 | 94 | 96 |
| $(Co_{0.94}Fe_{0.06})_{87}Nb_6V_1B_6$ | 0.26 | 0.33 | 94 | 96 |
| $(Co_{0.94}Fe_{0.06})_{87}Nb_6W_1B_6$ | 0.26 | 0.32 | 94 | 96 |

Figure 14:
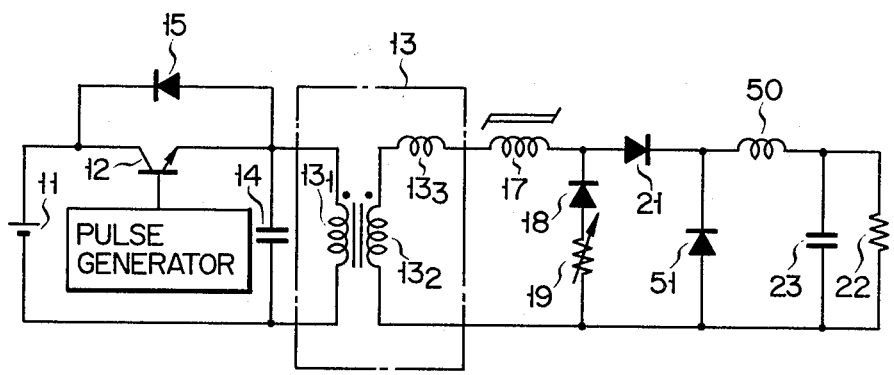

A saturable reactor prepared from any of the amorphous magnetic alloys having the compositions listed in Table II above is applicable not only to the switching circuit of FIG. 1 but also those of FIGS. 14 and 15.

The switching circuit of FIG. 14 is constructed by adding a choke coil 50 and reflux diode to the circuit of FIG. 1, thereby reducing switching loss. For the switching circuit of FIG. 14, refer to a U.S. patent application (Ser. No. 349,094) filed on Feb. 16, 1982. The switching circuit of FIG. 15 is the push-pull type. The transistors 12-1, 12-2 are alternately rendered conducting by pulses sent forth from a pulse generator 10. After the transistor 12-1 is operated, a saturable reactor 17-1 is set. Power is supplied from a transformer 13 to a load 22 through a rectifier diode 21-1 and choke coil 50. When the transistor 12-1 is turned off, current flows through the secondary winding $13_2$-1 of a transformer 13 in the opposite direction to the case when the transistor 12-1 is turned on. When said current causes the portion of a voltage divided by a resistor 52 to reach a predetermined level, then a transistor 54 and Zener diode 56 are rendered conducting. As a result, a feedback current flows to a saturable reactor 17-1 through a Zener diode 56, resistor 52, and diode 58-1, thereby resetting the saturable reactor 17-1. When the transistor 12-1 is again rendered conducting, electric power is not supplied to a load 22 until the saturable reactor 17-1 is reset. Consequently, electric power or voltage supplied to the load 22 is controlled. When a transistor 12-2 is intermittently operated, the saturable reactor 17-2, rectifier diode 21 and diode 58 are likewise operated, causing controlled electric power to be supplied from the secondary windings $13_2$-2, $13_2$-1 to the load 22.

What we claim is:

1. A high frequency switching circuit which comprises:
   a single-ended switching circuit including a transformer having a primary winding and a secondary side circuit and a switching element connected between the primary winding of said transformer and DC source;
   means for effecting switching with a predetermined cycle and for a predetermined conductive period;
   means for rectifying and smoothing a supplied voltage, which includes a filtering capacitor connected in parallel with a rectifying element and load; and
   a magnetic amplifier which is connected between said secondary side circuit of said transformer and said rectifying-smoothing means and includes a saturable reactor, said saturable reactor having a coercive force Hc of 0.6 Oe or below and a rectangular ratio Br/Bs of 80% or above at an operating frequency of 20 kHz or above and being prepared from an amorphous alloy having a composition of $(Co_u Fe_v Ni_w)_{100-z} X_z$ or $$(Co_u Fe_{1-u})_{100-x-y} T_x B_y$$

where:
   x = at least one selected from a group consisting of the elements of P, B, C, Si and Ge
   $0 \leq u \leq 1.0$
   $0 \leq v \leq 1.0$
   $0 \leq w \leq 0.7$
   $15 \leq z \leq 30$
   $u + v + w = 1.0$
   T = at least one selected from a group consisting of Ti, Zr, Hf, V, Nb, Ta, Cr, Mo and W
   $6 \leq x \leq 15$
   $0 \leq y \leq 10$.

2. The high frequency switching circuit according to claim 1, wherein the magnetic alloy has a composition of $(Co_{1-a-b-c} Fe_a Ni_b M_c)_{1-d} X_d$ where:
   M = at least one selected from a group consisting of the elements of Nb, Cr, Mo, V, Ta, Ti, Zr, Mn, Hf and W
   X = B or a compound of B and Si in which the content of Si is set at 25 atomic % or less
   $0.04 \leq a \leq 0.15$
   $0 \leq b \leq 0.10$
   $0.005 \leq c \leq 0.10$
   $0.15 \leq d \leq 0.30$.

3. The high frequency switching circuit according to claim 1, wherein the amorphous magnetic alloy has a composition of $(Fe_{1-a} Ni_a)_{1-b} X_b$ where:
   X = B or a compound of B and Si in which the amount of Si is set at 25 atomic % or less
   $0.3 \leq a \leq 0.7$
   $0.15 \leq b \leq 0.30$.

4. The high frequency switching circuit according to claim 1, wherein the amorphous magnetic alloy has a composition of $(Co_{1-z} Fe_z)_{100-x-y} T_x B_y$ where:
   $8 \leq x \leq 12$
   $0 \leq y \leq 7$
   $0.01 \leq z \leq 0.10$.

5. The high frequency switching circuit according to any of claims 1 to 4, wherein said single-ended switching circuit further includes a resonance capacitor connected in parallel with the primary winding of the transformer.

6. The high frequency switching circuit according to any of claims 1 to 4, wherein said magnetic amplifier further includes reflux means which is connected in parallel with said rectifying-smoothing means to allow for the passage of current stored in said saturable reactor and forms a closed circuit in co-operation with the rectifying-smoothing means.

7. The high frequency switching circuit according to claim 6, wherein said reflux means includes a diode and variable resistor connected in series with said diode.

8. The high frequency switching circuit according to any of claims 1 to 4, wherein said single-ended switching circuit further includes a damper diode connected across the switching element.

9. The high frequency switching circuit according to claim 1, which further comprises a choke coil connected between the output terminal of said rectifying means and a load.

* * * * *